United States Patent [19]

Swartzendruber

[11] 4,070,990
[45] Jan. 31, 1978

[54] FEEDER PAN ASSEMBLY

[75] Inventor: Ray E. Swartzendruber, Syracuse, Ind.

[73] Assignee: Chore-Time Equipment Inc., Milford, Ind.

[21] Appl. No.: 654,166

[22] Filed: Feb. 2, 1976

[51] Int. Cl.² .............................................. A01K 5/00
[52] U.S. Cl. ...................................................... 119/53
[58] Field of Search ................... 119/53, 52 R, 52 AF, 119/53.5, 77

[56] References Cited

U.S. PATENT DOCUMENTS

| D. 132,421 | 5/1942 | Krapp | 119/77 X |
|---|---|---|---|
| 1,069,943 | 8/1913 | Haffey | 119/77 |
| 1,565,117 | 12/1975 | Stabbert | 119/77 |
| 1,699,501 | 1/1929 | McCartney | 119/53 X |
| 3,511,215 | 5/1970 | Myers | 119/53 |
| 3,911,868 | 10/1975 | Brembeck | 119/53 |

Primary Examiner—Jay N. Eskovitz
Attorney, Agent, or Firm—Olson, Trexler, Wolters, Bushnell & Fosse, Ltd.

[57] ABSTRACT

A feeder pan assembly is provided for use with poultry and the like. A hood includes a shell which extends into a pan to define an annular feeding area accessible to the poultry. A hood-pan interconnector includes a number of supports which are curved and inclined to slide over a corresponding number of ramps formed upon the shell. When the hood and interconnectors are relatively rotated, the interconnector supports slide over the ramps to raise or lower the pan. This pan position readjustment increases or decreases the amount of feed flowing into the feeder pan assembly feeding area.

1 Claim, 5 Drawing Figures

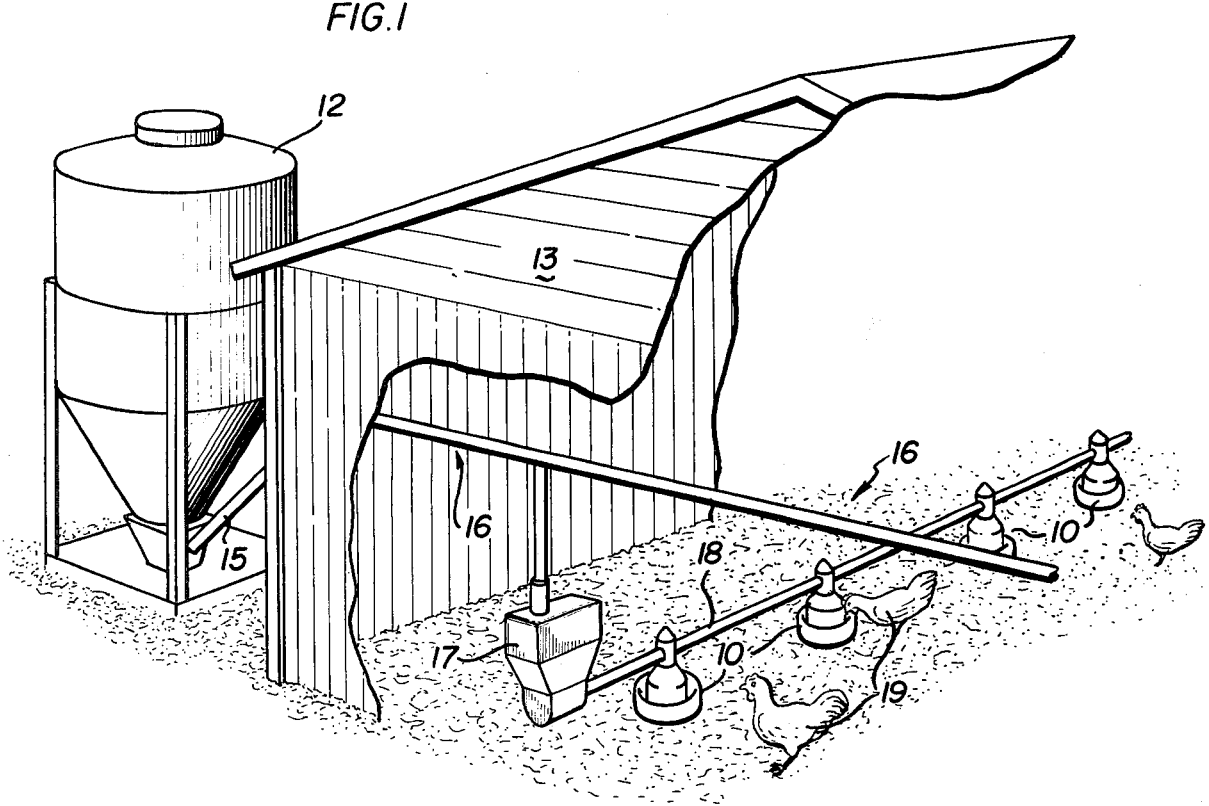
FIG.1
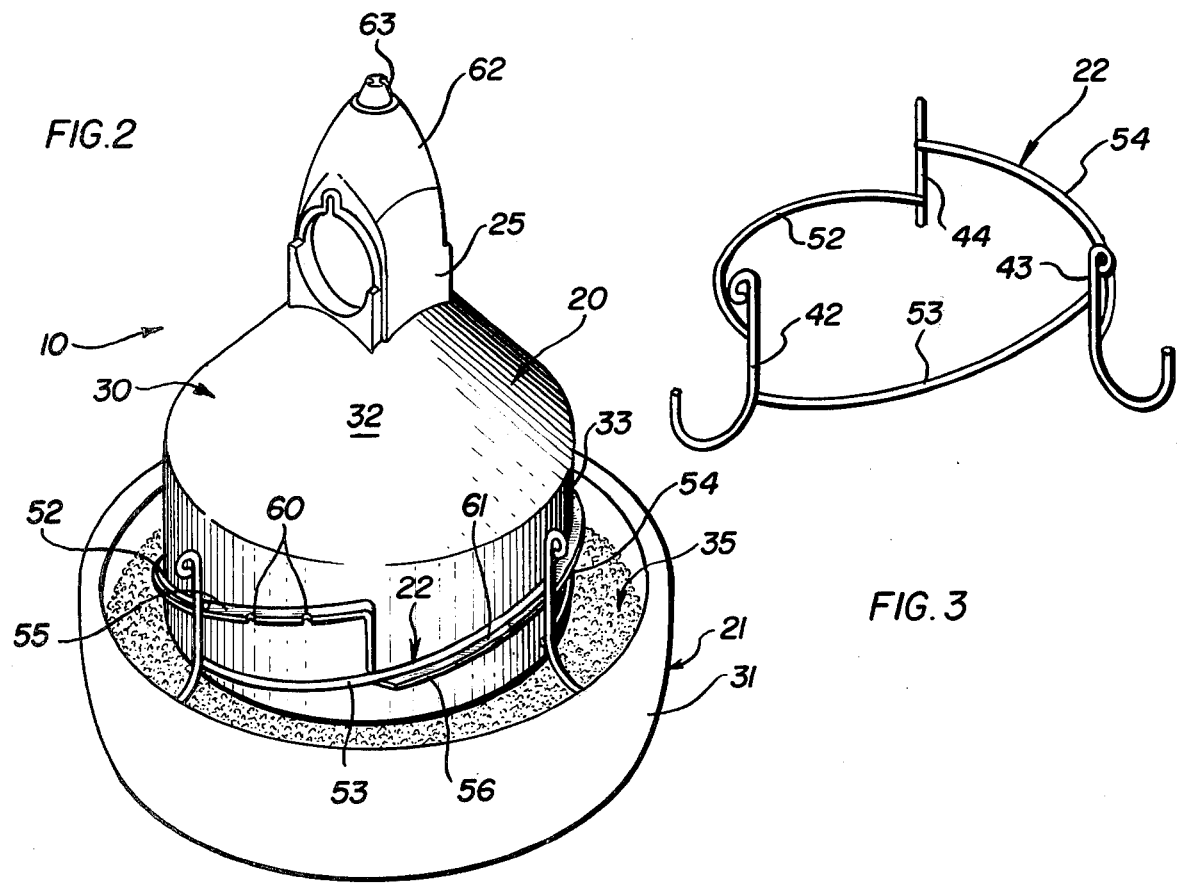
FIG.2
FIG.3

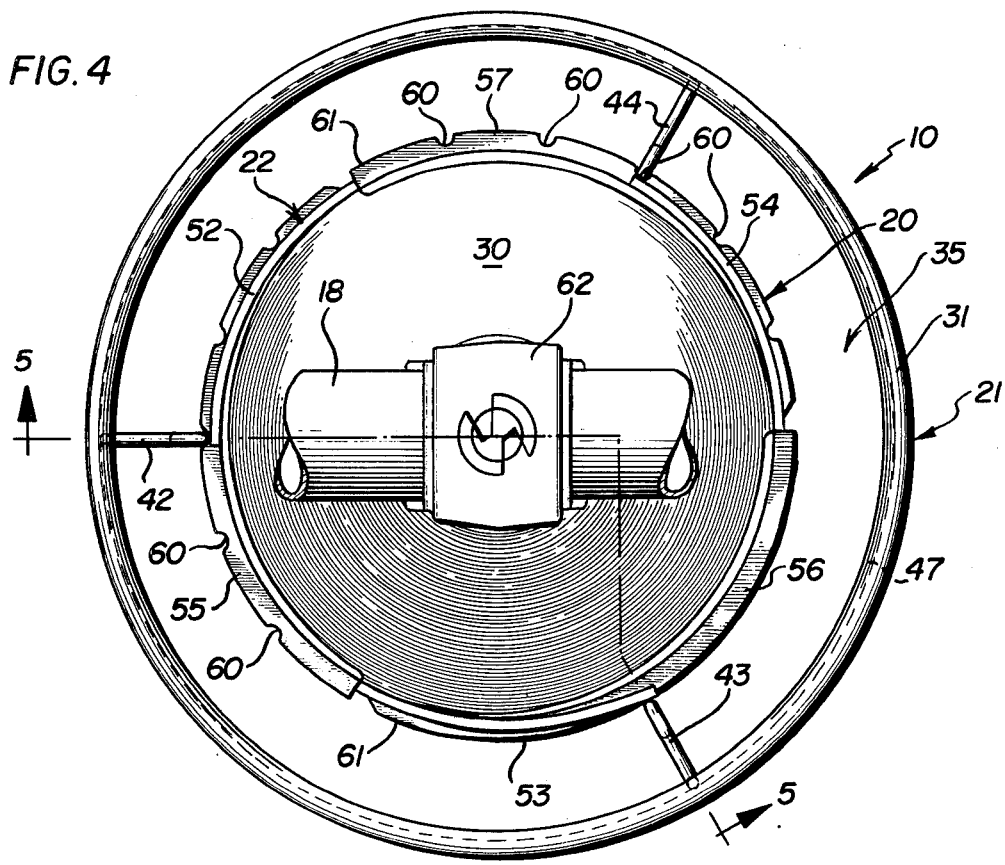

FEEDER PAN ASSEMBLY

BACKGROUND OF THE INVENTION

This invention relates to animal feeding systems, and more particularly concerns feeder pan assembly apparatus for poultry and like animals.

Among the important parts of modern feeding systems for poultry and like animals are the feeder pans or pan assemblies. These feeder pans receive feed flowing from system conveyors or like mechanisms, and are disposed within a poultry house so as to afford the poultry ready access to the feed they contain. Some of these devices include, in general, a pan for receiving and disposing feed for access by the poultry, and a hood overlying the pan which accepts feed from a conveyor or like delivery device. This hood may store a quantity of feed within it and above the pan for gradual dispensation to the poultry through a gate defined between adjacent surfaces of the pan and hood. An interconnector is provided to attach the hood to the pan.

Usually, the pan is suspended at a position spaced below the hood. Adjustment of this hood-pan relation permits greater or lesser amounts of feed to flow into the pan assembly feeding area. These adjustments may be necessary when raising a flock of growing, maturing poultry. Among such feeder pan assemblies which have met with commercial success is the device described and claimed in U.S. Pat. No. 3,911,868.

It is an object of the present invention to provide an effective, trouble-free, yet inexpensive feeder pan assembly.

A more specific object of the invention is to provide an inexpensive feeder pan assembly having a hood which accommodates a pan interconnector in a way allowing the interconnector and pan to be easily adjusted or reset relative to the hood so as to open and close hood-pan feed passage gates and allow a greater or lesser flow of feed to a feeding area.

Another object of the invention is to provide such a pan assembly wherein feed passage gate adjustment can be accomplished easily and quickly even by inexperienced personnel. A related object is to provide a feeder pan assembly in which this adjustment mechanism is not affected by poultry activity, or by feed or other materials which may be thrown upon the hood and mechanism.

Yet another object is to provide such a device in which the adjustment mechanism is designed to be only slightly stressed, thereby encouraging long pan assembly service life.

A further object is to provide such a feeder pan in which no adjustment mechanism slots need be cut through the hood material, thereby lowering the finished pan assembly cost.

A still further object is to provide a feeder pan assembly in which the interconnector support structure extends only minimally within the pan, thereby eliminating places within the pan which poultry cannot reach and in which food meal can spoil.

Other objects and advantages of the invention will become apparent upon reading the following detailed description and upon reference to the drawings. Throughout the description, like reference numerals refer to like parts.

BRIEF DESCRIPTION OF THE DRAWINGS

FIG. 1 is a perspective view of a poultry house and associated feeding system utilizing the novel feeder pan assemblies;

FIG. 2 is a perspective view showing in its general aspect the novel feeder pan assembly of the present invention;

FIG. 3 is a perspective view showing the hood-pan interconnector device;

FIG. 4 is a top plan view of the feeder pan assembly; and

FIG. 5 is a sectional view taken substantially in the planes of line 5—5 in FIG. 4.

DETAILED DESCRIPTION

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

Turning first to FIG. 1, there are shown a number of feeder pans 10 embodying the present invention as they appear when utilized with a modern poultry feeding system. A bulk storage bin 12, which may be located outside a poultry house 13, contains a large quantity of feed. This feed is transported to the interior of the house 13 by a bulk conveyor 15. Drop tubes 16 can be employed to direct the feed in a controlled manner to subsidiary hoppers 17. Individual transport conveyors 18 lead from such hoppers 17 to the individual feeder pan assemblies 10. These pan assemblies 10 present the feed for consumption by poultry 19 or like animals. In general, this feeder pan assembly 10 can be considered to include a hood member 20 and a pan member 21 which are held together by an interconnector 22, as shown in FIGS. 2, 4 and 5.

Modern poultry feeding practice calls for storage of a limited quantity of feed within the feeder pan assembly 10 to insure that the poultry will have an adequate supply at all appropriate times. To this end, the hood 20 includes a feeder tube 25 which here fits over and receives feed from a conveyor source 18. To direct the feed toward the pan 21, the feeder tube 25 extends downwardly to a bottom edge 26 which is located at a position spaced above a conical pan floor 28, thereby defining a first feed passage gate 29 between the feeder tube bottom edge 26 and the pan floor 28.

As will be understood, the feed passing from the conveyor tube 18 (as through a dispensing hole not shown) into the feeder tube 25 falls upon the pan floor 28. When a sufficient amount of feed has accumulated in the feeder tube 25, additionally delivered feed piles or backs up within the feeder tube 25 and may eventually cover the conveyor dispenser hole, thereby prohibiting further delivery of feed to this particular pan device.

It is also desirable that the feeding area from which the poultry can obtain this feed be restricted in its size to discourage the poultry from climbing inside the device and spoiling the feed with excrement or kicking the feed out of the pan.

To prohibit the poultry or other animals from climbing onto and within the pan assembly 10, and to prohibit their access to the passage gate 29, thus prohibiting their raking out excess quantities of feed, the hood 20 also includes a shell 30 which is connected to the feeder tube 25. The shell 30 extends radially outwardly to follow the outer side 31 of the pan 21. As illustrated particularly in FIG. 5, this shell 30 has a sloped roof 32, which terminates in an outer wall 33 extending downwardly and at least partly into the pan 21. When spaced apart from the outer pan edge 31 as illustrated, an annular feeding space 35 is defined which makes feed accessible to the poultry, but which is so restricted in its radial extent as to discourage the poultry from climbing into the pan 21. Like the feeder tube 25, this shell 30 and its wall 33 terminate in a lower edge 36 which, can be spaced above the conical pan 28 so as to provide a second hood-pan gate 39 through which feed must pass before arriving in the feeding area 35 for consumption by the poultry. A rigid hood feeder tube-shell unit is assured by providing a number of brace arms 40 between the tube 25 and shell 30 when the hood is formed.

The interconnector 22 rigidly suspends the pan 21 from the hood 20 in a position to provide the annular feed gates 29 and 39. To minimize interference of the interconnector structure with the poultry, and to minimize the number of spots within the pan feeder area 35 which cannot be reached and cleaned by the poultry, this interconnector 22 includes a number of struts 42, 43 and 44 which extend down the shell outer side 33, across the interior contours 46 of the pan 21 and thence upwardly into engagement with an undercut pan lip 47. Here, these three struts 42–44 are equiangularly spaced and are connected to one another by three inclined supports 52, 53 and 54 for rigidity and proper yet unencumbered pan support. In the interests of interconnector rigidity and manufacturing economy, each strut 42–44 can be connected to two adjacent support members 52–54. These devices can be formed of wire, and the struts 42–44 can be turned to provide finger grips structure as illustrated.

To permit the pan 21 to be easily raised and lowered between the position shown in solid lines in FIG. 5 and that shown in phantom lines in accordance with the invention, the interconnector support struts 52–54 inclusive are curved and inclined to lie upon corresponding ramps 55, 56 and 57 formed on the hood 20 and shell wall 33. Feeder pan assembly construction costs are minimized by forming these hood ramps 55–57 integrally with the hood, as by molding when the resinous plastic hood member 20 itself is formed. As can be envisioned, simple rotation of the interconnector 22 and, if necessary, pan 21, relative to the hood 20 causes the interconnector supports 52–54 to slide either upwardly or downwardly along the corresponding supporting ramp 55–57. This pan raising or lowering correspondingly opens or closes the feed gates 29 and 39, thereby regulating the flow of feed from the feeder tube 25 into the feeding space 35.

To permit the pan 21 to be located precisely relative to the feed tube bottom edge 26 and shell bottom edge 36, detents 60 are formed in an outer edge 61 of one or more of the ramps 55–57. These detents 60 are sized and disposed to accommodate vertical portions of the struts 42, 43 and 44. When the struts are disposed within these detents, rotational movement of the interconnector means 22 and the struts 42–44 past the detents 60 is prohibited. To minimize stress upon the wire interconnector parts, the struts 42–44 inclusive are secured, as by welding or other convenient means, to outer edges of the interconnector supports 52–54. When so arranged, the struts 42–44 can rest within these detents 60 while the associated supports 52–54 lie upon the corresponding ramps 55–57.

Like the sloping shell roof 32, the feeder tube 25 is provided with a sloping top 62 to discourage poultry from roosting on the feeder assembly. Since the poultry cannot roost upon the feeder assembly, no unintended weight is applied to either the pan assembly 10 or the supporting conveyor 18, and longer service life of both is promoted. Atop the feeder tube roof 62 an electrical insulator 63 can be provided to support an electrically charged wire (not shown) above the conveyor tube 18 in a position to further discourage poultry from roosting on the feeder pan assembly 10 or elsewhere on the tube 18.

In operation, feed is delivered from the conveyor 18 to the pan assembly 10 as described above, and proceeds down the feeder tube 25, through the first gate 29, along the conical pan floor 28, through the second gate 39, and into the feeding area 35. When it is desired to adjust this flow of feed, the size of these gates 29 and 39 can be adjusted. To accomplish this, the strut members are withdrawn by pulling the struts 42–44 from the detents 60 formed in the ramps 55–57. The interconnector 22 and pan 21 are then repositioned relative to the hood 20. When the struts 42–44 again snap into place within appropriate detents 60, a rigid pan assembly is again presented. Varying amounts of feed can thus be presented in the feeding area 35 over a long, effective pan assembly service life.

The invention is claimed as follows:

1. A feeder for poultry and the like, comprising pan means having an annular undercut lip portion and a pan bottom, hood means including feeder tube means adapted to receive feed from a source and direct it toward the pan means and shell means connected to the feeder tube means and extending to follow the contour of the pan means lip, and locatable at least partly within the pan means but spaced apart from the pan means lip to define an annular feeding area accessible to the poultry, and also spaced apart from the pan bottom to define with the bottom a gate through which the feed must pass when traveling from the feeder tube to the annular feeding area, three inclined ramp members each unitarily formed with and projecting from the shell means, and an interconnector means including three strut members each adapted to extend down the shell means outer contours, across the interior contours of the pan, and thence upwardly into engagement with the pan means lip, and three angularly extended and inclined supports, each support being curved and inclined to lie upon the shell means ramp member with a line contact and secured to two adjacent struts at respective outer strut edges, and being vertically separated from both adjacent supports, whereby rotation of the interconnector means relative to the hood means causes the interconnector supports to slide along the corresponding shell ramps so as to raise or lower the pan means relative to the hood means and consequently to open or close the feed gate, each ramp being defined by an outer edge, and two only of the three outer ramp edges being formed to define a plurality of angularly and regularly spaced apart detents, each detent being sized and disposed to accommodate a strut whereby to inhibit movement of the strut past the detent and corresponding movement of the support along the ramp and consequent vertical movement of the pan relative to the hood and to permit said movement when the two interconnector struts are simultaneously moved out of engagement with the detents.

* * * * *